US009666891B2

(12) United States Patent
Bierschenk et al.

(10) Patent No.: US 9,666,891 B2
(45) Date of Patent: *May 30, 2017

(54) GAS PHASE MODIFICATION OF SOLID OXIDE FUEL CELLS

(71) Applicant: PHILLIPS 66 COMPANY, Houston, TX (US)

(72) Inventors: David M. Bierschenk, Bartlesville, OK (US); Ying Liu, Bartlesville, OK (US); Mingfei Liu, Bartlesville, OK (US); Ting He, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/504,774

(22) Filed: Oct. 2, 2014

(65) Prior Publication Data
US 2015/0099212 A1 Apr. 9, 2015

Related U.S. Application Data

(60) Provisional application No. 61/888,218, filed on Oct. 8, 2013.

(51) Int. Cl.
H01M 4/86 (2006.01)
H01M 8/12 (2016.01)
H01M 8/1213 (2016.01)
H01M 8/1246 (2016.01)
H01M 4/88 (2006.01)
H01M 4/90 (2006.01)
H01M 8/124 (2016.01)

(52) U.S. Cl.
CPC ....... H01M 8/1213 (2013.01); H01M 4/8621 (2013.01); H01M 4/8652 (2013.01); H01M 4/8657 (2013.01); H01M 4/8817 (2013.01); H01M 4/8867 (2013.01); H01M 4/8878 (2013.01); H01M 4/905 (2013.01); H01M 4/9025 (2013.01); H01M 4/9033 (2013.01); H01M 4/9058 (2013.01); H01M 8/1246 (2013.01); H01M 2008/1293 (2013.01); H01M 2300/0074 (2013.01); H01M 2300/0077 (2013.01); Y02E 60/525 (2013.01); Y02P 70/56 (2015.11)

(58) Field of Classification Search
CPC ............ H01M 4/8621; H01M 4/8846; H01M 4/8857; H01M 4/9033; H01M 4/8663; H01M 8/12; H01M 4/8889; H01M 2008/1293
See application file for complete search history.

(56) References Cited

U.S. PATENT DOCUMENTS 3,220,086 A 11/1965 Geisen, Jr.
3,533,833 A 10/1970 Takahashi, et al.
3,823,302 A 7/1974 Muehlberger
3,839,618 A 10/1974 Muehlberger
4,049,841 A 9/1977 Coker et al.
4,264,641 A 4/1981 Mahoney et al.
4,436,794 A 3/1984 Takeuchi et al.
4,591,538 A 5/1986 Kunz
4,609,562 A 9/1986 Isenberg et al.
4,971,830 A 11/1990 Jensen
5,035,962 A 7/1991 Jensen
5,085,742 A 2/1992 Dollard et al.
5,234,722 A 8/1993 Ito et al.
5,356,728 A 10/1994 Balachandran et al.
5,387,482 A 2/1995 Anani
5,426,003 A 6/1995 Spengler et al.
5,516,597 A 5/1996 Singh et al.
5,527,633 A 6/1996 Kawasaki et al.
5,549,983 A 8/1996 Yamanis
5,716,422 A 2/1998 Muffoletto et al.
5,908,713 A 6/1999 Ruka et al.
6,139,637 A 10/2000 Takahashi et al.
6,248,468 B1 6/2001 Ruka et al.
6,558,831 B1 5/2003 Doshi et al.
7,014,942 B2 3/2006 Gorte et al.
7,045,237 B2 5/2006 Sridhar et al.
7,067,215 B2 6/2006 Lazaroff et al.
7,445,814 B2 11/2008 Mardilovich et al.
7,476,461 B2 1/2009 Finnerty
7,485,385 B2 2/2009 Seccombe, Jr. et al.
7,527,761 B2 5/2009 Swartzlander et al.
7,553,568 B2 6/2009 Keefer
7,592,090 B2 9/2009 Seabaugh et al.

(Continued)

FOREIGN PATENT DOCUMENTS

EP 0439938 8/1991
EP 2005152716 6/2005

(Continued)

OTHER PUBLICATIONS

Yunhui Gong, Diego Palacio, Xueyan Song, Rajankumar L. Patel, Xinhua Liang, Xuan Zhao, John B. Goodenough and Kevin Huang, "Stabilizing Nanostructured Solid Oxide Fuel Cell Cathode with Atomic Layer Deposition," ACS Publications, NANO Letters, 2013, vol. 13, pp. 4340-4345.

Thomas H. Etsell and Douglas G. Ivey, "A New Vapor Deposition Method to Form Composite Anodes for Solid Oxide Fuel Cells," Journal of the American Ceramic Society, 2000, vol. 83, No. 7, pp. 1626-1632.

PCT Notification of Transmittal of the International Search Report and the Written Opinion of the International Searching Authority, or the Declaration, International Application No. PCT/US2014/058825, International Filing Date: Oct. 2, 2014, 13 pages.

Dong Ding, Beibei Liu, Zina Zhu, Shuai Zhou, and Changrong Xia, "High Reactive Ce0.8Sm0.21.9 Powders Via a Carbonate Co-Precipitation Method as Electrolytes for Low Temperature Solid Oxide Fuel Cells," 2008, pp. 896-899.

M. Stanley Whittingham, "Electrical Properties of Ceria-Based Oxides and their Application to Solid Oxide Fuel Cells", vol. 52, No. 1-3, 1992, pp. 162-172.

(Continued)

Primary Examiner — Muhammad Siddiquee
(74) Attorney, Agent, or Firm — Phillips 66 Company

(57) ABSTRACT

A solid oxide fuel cell comprising an electrolyte, an anode and a cathode. In this fuel cell at least one electrode has been modified with a promoter using gas phase infiltration.

16 Claims, No Drawings

(56) References Cited

U.S. PATENT DOCUMENTS

| | | | |
|---|---|---|---|
| 7,595,127 | B2 | 9/2009 | Seabaugh et al. |
| 7,604,892 | B2 | 10/2009 | Yoo et al. |
| 7,618,731 | B2 | 11/2009 | Kumar et al. |
| 7,651,810 | B2 | 1/2010 | Wei et al. |
| 7,691,521 | B2 | 4/2010 | Ahmed et al. |
| 7,749,626 | B2 | 7/2010 | Take |
| 7,842,200 | B2 | 11/2010 | Ehrman et al. |
| 7,914,636 | B2 | 3/2011 | Lee et al. |
| 8,802,316 | B1 | 8/2014 | Liu et al. |
| 2003/0162082 | A1 | 8/2003 | Allen et al. |
| 2004/0018409 | A1 | 1/2004 | Hui et al. |
| 2005/0214599 | A1 | 9/2005 | Sakai et al. |
| 2006/0125157 | A1* | 6/2006 | Swartzlander ........ C04B 35/488 264/618 |
| 2006/0134491 | A1 | 6/2006 | Hilchenko et al. |
| 2006/0141137 | A1 | 6/2006 | Anderson et al. |
| 2006/0204809 | A1 | 9/2006 | Horiuchi et al. |
| 2006/0263655 | A1 | 11/2006 | Schaevitz et al. |
| 2007/0180689 | A1 | 8/2007 | Day et al. |
| 2008/0029026 | A1 | 2/2008 | Selman et al. |
| 2008/0131748 | A1 | 6/2008 | Katagiri et al. |
| 2009/0202881 | A1 | 8/2009 | Uchiyama |
| 2009/0246567 | A1 | 10/2009 | Hyldtoft et al. |
| 2010/0062312 | A1 | 3/2010 | Larsen et al. |
| 2010/0112408 | A1 | 5/2010 | Yang et al. |
| 2010/0123370 | A1 | 5/2010 | Yamaguchi et al. |
| 2010/0209816 | A1* | 8/2010 | Kwak |
| 2010/0255406 | A1 | 10/2010 | Kang et al. |
| 2011/0195342 | A1 | 8/2011 | Luo et al. |
| 2011/0198216 | A1* | 8/2011 | Larsen ................ H01M 4/8663 204/242 |
| 2011/0210281 | A1 | 9/2011 | Kaigawa et al. |
| 2011/0305973 | A1 | 12/2011 | Kobayashi et al. |
| 2012/0043010 | A1 | 2/2012 | Batawi et al. |
| 2013/0052562 | A1 | 2/2013 | Yoon |
| 2013/0074317 | A1 | 3/2013 | Weber et al. |
| 2013/0143142 | A1* | 6/2013 | Liu ........................ H01M 8/145 429/478 |
| 2013/0209904 | A1 | 8/2013 | Liu et al. |
| 2013/0224627 | A1* | 8/2013 | Liu ..................... H01M 8/1246 429/489 |

FOREIGN PATENT DOCUMENTS

| | | |
|---|---|---|
| EP | 1930974 | 6/2008 |
| EP | 2031677 | 3/2009 |
| EP | 2031684 | 3/2009 |
| WO | 03036746 | 5/2003 |
| WO | 2011100361 | 8/2011 |
| WO | 2012018297 | 2/2012 |
| WO | 2012054420 | 4/2012 |
| WO | 2013060669 | 5/2013 |

OTHER PUBLICATIONS

Daisuke Hirabayashi, Atsuko Tomita, Takashi Hibino, Masahiro Nagao and Mitsuru Sano, 2004, "Design of a Reduction-Resistant Ce0.8SM0.2O1.9 Electrolyte Through Growth of a Thin BaCe1-xSM$_x$O3—Layer Over Electrolyte Surface", 2004, vol. 7, No. 10, pp. A318-A320.

Daisuke Hirabayashi, Atsuko Tomita, Shinya Teranishi, Takashi Hibino and Mitsuru Sano, Improvement of a Reduction-Resistant Ce0.8Sm0.2O1.9 Electrolyte by Optimizing a Thin BaCe1-$_x$Sm$_x$O3-$_x$ Layer for Intermediate—Temperature SOFCS, vol. 176, 2005, pp. 881-887.

Science, Yun-Hui Huang, Ronald I. Dass, Zheng-Liang Xing, John B. Goodenough, "Double Perovskites as Anode Materials for Solid-Oxide Fuel Cells", Apr. 14, 2006, 5 pages.

T. Inoue, T. Setoguchi, K. Eguchi and H. Arai, "Study of a Solid Oxide Fuel Cell with a Ceria-Based Solid Electrolyte" vol. 35, 1989, pp. 285-291.

S.P. Jiang & W. Wang, "Novel Structured Mixed Ionic and Electronic Conducting Cathodes of Solid Oxide Fuel Cells," 2005, vol. 176, pp. 1351-1357.

Mingfei Liu, Dong Ding, Yaohui Bai, Ting He and Melin Liu, "An Efficient SOFC Based on Samaria-Doped Ceria (SDC) Electrolyte", 2012, vol. 159, No. 6, pp. B661-B665.

Mingfei Liu, Jianfeng Gao, Dehua Dong, Xingqin Liu and Guangyao Meng, "Comparative Study on the Performance of Tubular and Button Cells with YSZ Membrane Fabricated by a Refined Particle Suspension Coating Technique," International Journal of Hydrogen Energy 35, 2010, pp. 10489-10494.

Mingfei Liu, Ranran Peng, Dehua Dong, Jianfeng Gao, Xingqin Liu, and Guangyao Meng, "Direct Liquid Methanol-Fueled Solid Oxide Fuel Cell," Journal of Power Sources, 185, 2008, pp. 188-192.

Mingfei Liu YongMan Cho, Lei Yang, Kevin Blinn, Wentao Qin, Ping Liu and Meilin Liu, "Direct Octane Fuel Cells: A Promising Power for Transportation," Nano Energy 2012 1, pp. 448-455.

Mingfei Liu, Dehua Dong, Fei Zhao, Jianfeng Gao, Dong Ding, Xingqin Liu and Guangyao Meng, "High-Performance Cathode-Supported SOFCS Prepared by a Single-Step Co-Firing Process," Journal of Power Sources 182, 2008, pp. 585-588.

Melin Liu, Matthew E. Lynch, Kevin Blinn, Faisal M. Alamgir and YongManChoi, "Rational SOFC Material Design: New Advances and Tools," Nov. 2011, No. 11, vol. 14, pp. 534-546.

Mingfei Liu, Dehua Dong, Ranran Peng, Jianfeng Gao, Juan Diwu, Xingquin Liu and Guangyao Meng, YSZ-Based SOFC with Modified Electrode/Electrolyte Interfaces for Operating at Temperature Lower Than 650° C., Journal of Power Sources 180, 2008, pp. 215-220.

Zongping Shao & Sossina M. Haile, "A High Performance Cathode for the Next Generation of Solid-Oxide Fuel Cells," Nature, vol. 431, 2004, pp. 170-173.

A. Tsoga, A. Naoumidis, D. Stover, Total Electrical Conductivity and Defect Structure of ZrO2—CeO2—Y2O3—Gc2O3 Solid Solutions, vol. 135, 2000, pp. 403-409.

Lei Yang, Shizhong Wang, Kevin Blinn, Mingfei Liu, Ze Liu, Zhe Cheng, Meilin Liu, Enhanced Sulfur and Coking Tolerance of a Mixed Ion Conductor for SOFCs: BaZr0.Ce0.7Y0.2-xYbx03-δ, Science, 2009, Vole 326, pp. 126-129.

Lei Yang, YongMan Choi, Wentao Qin, Haiyan Chen, Kevin Blinn, Mingfei Liu, Ping Liu, Jianming Bai, Trevor A Tyson & Melin Liu, "Promotion of Water-Mediated Carbon Removal by Nanostructured Barium Oxide/Nickel Interfaces in Solid Oxide Fuel Cells," Nature Communications, 2011, pp. 1-9.

Zhongliang Zhan and Scott A. Barnett, "An Octane-Fueled Solid Oxide Fuel Cell," Science, 2005, vol. 308, pp. 844-847.

Xinge Zhang, Mark Robertson, Cyrille Deces-Petit, Yongsong Xie, Rob Hui, Wei Qu, Olivera Kesler, Radenka Maric and Dave Ghosh, "Solid Oxide Fuel Cells with Bi-Layered Electrolyte Structure", ScienceDirect, 2008, pp. 800-805.

Ling Zhao, Beibei He, Junchong Shen, Fanglin Chen and Changrong Xia, "BaZr0.1Ce0.7Y0.2O3-δ as an Electronic Blocking Material for Microtubular Solid Oxide Fuel Cells Based on Doped Ceria Electrolyte," Electrochemistry Communications 13, 2011, pp. 450-453.

Chendong Zuo, Shaowu Zha, Meilin Liu, Masaharu Hatano and Makoto Uchiyama, "Ba(Zr01C20.7Y0.2)O3-δ As an Electrolyte for Low-Temperature Solid-Oxide Fuel Cells," Adv. Mater. 2006, vol. 18, pp. 3318-3320.

Renewable Energy Focus, News, "New Ceramic Material May Expand Uses for Solid Oxide Fuel Cells," 2 pages.

Xue Li, Nansheng Xu, Lingling Zhang and Kevin Huang, "Combining Proton Conductor BaZr0.8Y0.2O3-67 With Carbonate: Promoted Densification and Enhanced Proton Conductivity," Electrochemistry Communications 13, 2011, pp. 694-697

Kazumi Tanimoto, Yoshinori Miyazaki, Masahiro Yangagida, Shigeo Tansae, Toshikatsu Kojima, Norikazu Ohtori, Hironobu Okuyama and Teruo Kodama, "Cell Performance of Molten-Carbonate Fuel Cell with Alkali and Alkaline-Earth Carbonate Mixtures," Journal of Power Sources, 39, 1992, pp. 285-297.

(56) References Cited

OTHER PUBLICATIONS

Carina Lagergren, Goran Lindbergh, "Experimental Determination of Effective Conductivities in Porous Molten Carbonate Fuel Cell Electrodes," Electrochimca Act 44, 1998, pp. 503-511.
Changcheng Chen, Mingfei Liu, Yaohui Bai, Lei Yang, Erqing Xie and Meilin Liu, Anode-Supported Tubular SOFCs Based on BaZr0.1Ce0.7Y0.1Yb0.1O3-δ Electrolyte, Electrochemistry Communications, 13, 2011, pp. 615-618.
Focus News, "New Ceramic Material May Expand Uses for Solid Oxide Fuel Cells," 2009, 1 page.
PCT Invitation to Pay Additional Fees and, Where Applicable, Protest Fee, 6 pages.
PCT Notification of Transmittal of the International Search Report and the Written Opinion of the International Searching Authority, or the Declaration, International Application No. PCT/US20141013729, International Filing Date Jan. 30, 2014, 19 pages.
PCT Notification of Transmittal of the International Search Report and the Written Opinion of the International Searching Authority, International Application No. PCT/US2012/052690, International Filing Date Aug. 28, 2012, 23 pages.
PCT Notification of Transmittal of the International Search Report and the Written Opinion of the International Searching Authority, or the Declaration, International Application No. PCT/US2012/054609, International Filing Date Sep. 11, 2012, 12 pages.
PCT Notification of Transmittal of the International Search Report and the Written Opinion of the International searching Authority, or the Declaration, International Application No. PCT/US2013/041172, International Filing May 15, 2013, 10 pages.
PCT Notification of Transmittal of the International Search Report and the Written Opinion of the International Searching Authority, or the Declaration, International Application No. PCT/US2014/059069, International Filing Date Oct. 3, 2014, 16 pages.
PCT Notification of Transmittal of the International Search Report and the Written Opinion of the International Searching Authority, or the Declaration, International Application No. PCT/US2014/059231, International Filing Date Oct. 6, 2014, 10 pages.
Amendment and Response to Office Action Mail On Jun. 19, 2014, U.S. Appl. No. 13/596,787, filed Aug. 28, 2012, 11 pages.
Office Action dated Jun. 19, 2014, U.S. Appl. No. 13/596,787, filed Aug. 28, 2012, 25 pages.

* cited by examiner

GAS PHASE MODIFICATION OF SOLID OXIDE FUEL CELLS

CROSS-REFERENCE TO RELATED APPLICATIONS

This application is a non-provisional application which claims the benefit of and priority to U.S. Provisional Application Ser. No. 61/888,218 filed Oct. 8, 2013, entitled "Gas Phase Modification of Solid Oxide Fuel Cells," which is hereby incorporated by reference in its entirety.

STATEMENT REGARDING FEDERALLY SPONSORED RESEARCH OR DEVELOPMENT

None.

FIELD OF THE INVENTION

A method of gas phase modification of solid oxide fuel cells.

BACKGROUND OF THE INVENTION

The world relies heavily on energy produced from fossil fuels, but as a non-renewable energy source (at least in our lifetimes), fossil fuels have serious limitations. The ever-increasing demand and dwindling supply of fossil fuels will inevitably cause significant problems in the future. In remote areas of developing countries, transmission and distribution of fossil fuel-generated energy can be difficult and expensive. Additionally, the burning of fossil fuels results in the formation of smog and global warming, and further contributes to our environmental problems. Thus, developing a clean alternative energy industry is key to improving the quality of life for individuals and communities, and to ameliorate global warming and other environmental problems.

The critical technical barrier to the widespread application of various alternative energy technologies is performance limitations of the key materials. For example, in solar-fuel production, the efficiency is relatively low since the current photocathode materials show sluggish $H_2$ evolution reaction kinetics and the photoanode materials have insufficient light absorption and carrier collection capabilities. In wind power, the lifetime of turbine blades currently made of polymer-matrix composite materials reinforced with fiberglass or graphite fibers can be further enhanced when a new material with adequate stiffness to prevent failure as well as sufficient long term fatigue in harsh conditions is developed. Therefore, materials science and technology plays a pivotal role in building the world's energy future, from fundamental discovery science, to improving energy production processes. The discovery and optimization of new materials could effectively advance solutions to our energy challenges.

The demand for clean, secure, and renewable energy has stimulated great interest in fuel cells. Fuel cells are one distinct category of devices that are capable of converting chemical energy into electrical energy. Among the fuel cells that are currently under active development, alkaline, polymeric-electrolyte-membrane and phosphoric-acid fuel cells all require essentially pure hydrogen as the fuel to be fed to the anode.

Solid Oxide Fuel Cells ("SOFCs"), on the other hand, are a type of fuel cells that use a solid oxide or ceramic as the electrolyte of a cell. The basic solid oxide fuel cell is generally made up of three layers. A single cell consisting of these three layers stacked together is typically less than a few millimeters thick. Hundreds of these cells are then connected in series to form what most people refer to as an "SOFC stack". The ceramics used in SOFCs do not become electrically and ionically active until they reach very high temperature and as a consequence the stacks have to run at temperatures ranging from 500 to 1,000° C. Reduction of oxygen into oxygen ions occurs at the cathode. These ions can then diffuse through the solid oxide electrolyte to the anode where they can electrochemically oxidize the fuel. In this reaction, a water byproduct is given off as well as two electrons. These electrons then flow through an external circuit where they can do work. The cycle then repeats as those electrons enter the cathode material again.

SOFCs offer great promise for the most efficient and cost-effective utilization of a wide variety of fuels such as hydrocarbons, coal gas and gasified biomass. Because of the relatively high operating temperature (500-1000° C.), the fuel processing reaction can be carried out within the cell stacks without additional fuel processors. Another advantage of SOFCs is the fuel flexibility. A wide variety of practical hydrocarbons such as methane, propane, gasoline, diesel and kerosene can be directly utilized as the fuels in SOFCs. The direct utilization of hydrocarbon fuels will increase the operating efficiency and reduce system costs, which will accelerate substantially the use of SOFCs in transportation, residential and distributed-power application. Among the hydrocarbon fuels, natural gas such as methane is regarded as relatively cheap and popularly available fuel with plenty of deposits. Additionally, SOFCs that can directly run on natural gas would highly reduce the operating cost and accelerate the commercialization of SOFC system.

The basic chemical reactions at the anode side of an SOFC is the oxidation of fuels, such as hydrogen gas and/or carbon monoxide, to generate electrons:

$$\text{Anode: } H_2 + O^{2-} \rightarrow H_2O + 2e^-$$

$$\text{and/or } CO + O^{2-} \rightarrow CO_2 + 2e^-$$

The reaction at the cathode side is the reduction of oxygen to oxygen ions:

$$\text{Cathode: } O_2 + 4e^- \rightarrow 2O^{2-}$$

Therefore, the overall reaction of an SOFC becomes:

$$\text{Overall: } H_2 + \tfrac{1}{2}O_2 \rightarrow H_2O$$

$$\text{Or } H_2 + CO + O_2 \rightarrow H_2O + CO_2$$

Therefore, SOFCs typically run on pure hydrogen or mixture of hydrogen and carbon monoxide by internally or externally reforming a hydrocarbon fuel, while air serves as the oxidant. As shown above, if pure hydrogen is used, then the product is pure water, whereas carbon dioxide is produced if carbon monoxide is also used. Carbon dioxide and water are produced is hydrocarbon fuels are used.

In an effort to reduce fuel electrode manufacturing costs, sintering processes have been attempted, such as those described in U.S. Pat. Nos. 4,971,830, 5,035,962, 5,908,713 and 6,248,468. However, fuel electrodes applied by a sintering process are relatively time consuming in that it still requires at least two processing steps, an initial application followed by high temperature sintering. Moreover, sintered fuel electrodes may experience marginal physical stability over time.

Other attempts to reduce fuel electrode fabrication costs include plasma spraying (e.g. atmospheric plasma spraying "APS", vacuum plasma spraying "VPS", plasma arc spraying, flame spraying) which generally involves spraying a molten powdered metal or metal oxide onto an underlying substrate surface using a plasma thermal spray gun to form a deposited layer having a microstructure generally characterized by accumulated molten particle splats. Plasma spraying techniques are described in U.S. Pat. Nos. 3,220,068, 3,839,618, 4,049,841, and 3,823,302 and 4,609,562 generally teach plasma spray guns and use thereof, each of which are herein incorporated by reference in their entirety. Although plasma spraying has been used for fabrication of certain fuel cell layers, such as those described in U.S. Pat. Nos. 5,085,742, 5,085,742, 5,234,722 5,527,633 (plasma sprayed electrolyte) U.S. Pat. No. 5,426,003 (plasma sprayed interconnect), U.S. Pat. No. 5,516,597 (plasma sprayed interlayer) and U.S. Pat. No. 5,716,422 (plasma sprayed air electrode), use of such plasma spraying techniques have been of limited value when used to apply a fuel electrode onto an electrolyte because they tend to result in a fuel electrode that poorly adheres to the electrolyte and exhibits poor thermal cyclability due to the mismatch of thermal coefficients of expansion between the metal portion of the fuel electrode and the ceramic electrolyte. Moreover, these conventional plasma spraying techniques tends to result in a fuel electrode that has a low porosity after continued use, thereby causing voltage loss when current flows as a result of polarization due to a low rate of diffusion of fuel gases into and reaction product out from the interface between the fuel electrode and electrolyte.

There is thus a need for a SOFC and a method for making the SOFC that can generally achieve above-described favorable technical properties and can be manufactured at a low cost.

BRIEF SUMMARY OF THE DISCLOSURE

A solid oxide fuel cell comprising an electrolyte, an anode and a cathode. In this fuel cell at least one electrode has been modified with a promoter using gas phase infiltration.

BRIEF DESCRIPTION OF THE DRAWINGS

A more complete understanding of the present invention and benefits thereof may be acquired by referring to the follow description taken in conjunction with the accompanying drawings in which:
None

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

The current embodiments describe a solid oxide fuel cell (SOFC) comprising an electrolyte, an anode and a cathode. In this SOFC at least one electrode has been modified with a promoter using gas phase infiltration.

In one embodiment of the SOFC the anode is typically porous to allow the fuel to flow towards the electrolyte. Anodes are typically chosen for their (1) high electrical conductivity; (2) a thermal expansion that matches those of the adjoining components; (3) the capacity to avoid coke deposition; (4) fine particle size; (5) chemical compatibility with other cell components (electrolyte and interconnector) under a reducing atmosphere at the operating temperature; (6) large triple phase boundary; (7) high electrochemical or catalytic activity for the oxidation of fuel; (8) high porosity (20-40%) adequate for the efficient transport of fuel and reaction products; (9) good electronic and ionic conductive phases and (10) good catalytic activity for hydrocarbon reforming. In the current SOFC any known anode electrodes can be utilized. Types of anodes that can be used include Ni/YSZ, Cu/Ni, perovskite structures with a general formula of $ABO_3$. In the perovskite structure the A cations can be group 2, 3, or 10 elements or more specifically cations such as Ba, La, Sr, Ca or Sm. Also in the perovskite structure the B cations can be group 4, 6, 7, 8, 9, or 10 elements or more specifically cations such as Ti, Cr, Ni, Fe, Co, Mn or Zr. Other materials that the anode could be include nickel oxide, nickel, yttria stabilized zirconia, scandia stabilized zirconia, gadolinium doped ceria, samarium doped ceria, doped barium zirconate cerate, or combinations thereof.

In one embodiment the anode can be pre-reduced at a temperature from about 400° C. to about 800° C. in a reducing atmosphere containing 1-100% hydrogen or other reducing gas atmospheres.

In one embodiment of the SOFC the cathode is typically porous to allow the oxygen reduction to occur. Any cathode material known to those skilled in the art can be used. One example of cathode materials that are typically used include perovskite-type oxides with a general formula of $ABO_3$. In this embodiment the A cations are typically rare earths doped with alkaline earth metals including La, Sr, Ca, Pr or Ba. The B cations can be metals such as Ti, Cr, Ni, Fe, Co, Cu or Mn. Examples of these perovskite-type oxides include $LaMnO_3$. In one differing embodiment the perovskite can be doped with a group 2 element such as $Sr^{2+}$ or $Ca^{2+}$. In another embodiment cathodes such as $Pr_{0.5}Sr_{0.5}FeO_3$; $Sr_{0.9}Ce_{0.1}Fe_{0.8}Ni_{0.2}O_3$; $Sr_{0.8}Ce_{0.1}Fe_{0.7}Co_{0.3}O_3$; $LaNi_{0.6}Fe_{0.4}O_3$; $Pr_{0.8}Sr_{0.2}Co_{0.2}Fe_{0.8}O_3$; $Pr_{0.7}Sr_{0.3}Co_{0.2}Mn_{0.8}O_3$; $Pr_{0.8}Sr_{0.2}FeO_3$; $Pr_{0.6}Sr_{0.4}Co_{0.8}Fe_{0.2}O_3$; $Pr_{0.4}Sr_{0.6}Co_{0.8}Fe_{0.2}O_3$; $Pr_{0.7}Sr_{0.3}Co_{0.9}Cu_{0.1}O_3$; $Ba_{0.5}Sr_{0.5}Co_{0.8}Fe_{0.2}O_3$; $Sm_{0.5}Sr_{0.5}CoO_3$; or $LaNi_{0.6}Fe_{0.4}O_3$ can be utilized. Other materials that the cathode could be include lanthanum strontium iron cobalt oxide, doped ceria, strontium samarium cobalt oxide, lanthanum strontium iron oxide, lanthanum strontium cobalt oxide, barium strontium cobalt iron oxide, or combinations thereof.

The electrolyte used in the SOFC is responsible for conducting ions between the electrodes, for the separation of the reacting gases, for blocking internal electronic conduction, and for forcing the electrons to flow through the external circuit. Some of the typical characteristics that electrolytes typically invoke include (1) an oxide-ion conductivity greater than $10^{-3}$ S·cm$^{-1}$ at the operating temperature; (2) negligible electronic conduction, which means an electronic transport number close to one; (3) high density for gas impermeability; (4) thermodynamic stability over a wide range of temperatures and oxygen partial pressures; (5) a thermal expansion coefficient that is compatible with that of the electrodes and other cell materials from ambient temperature to cell operating temperature; (6) suitable mechanical properties, with fracture resistance greater than 100 MPa at room temperature; (7) negligible chemical interaction with electrode materials under operation and fabrication conditions to avoid formation of blocking interface phases; (8) ability to be fabricated as thin layers (less than 30 μm) and (9) low cost of starting materials and fabrication.

In the current SOFC the electrolyte can be any electrolyte known to those skilled in the art. In one embodiment the electrolyte comprises a porous BZCYYb as the backbone and carbonate as the secondary phase within the pores of.

The weight ratio of BZCYYb in the composite electrolyte may vary, as long as the composite electrolyte can reach higher conductivity as well as current density as compared to non-composite electrolyte. In one embodiment, the weight ratio of BZCYYb in the composite electrolyte ranges from 9:1 to 1:1, but more preferably ranges from 50-90% or 70-80%. In another embodiment, the weight ratio of BZCYYb is about 75%.

The weight percentage of carbonate in the composite electrolyte also may vary, as long as the composite electrolyte can maintain physical integrity during operation. In one embodiment, the weight percentage of carbonate in the composite electrolyte ranges from 10 to 50 wt %. In another embodiment, the weight percentage of carbonate in the composite electrolyte ranges from 20 to 30 wt %, in yet another embodiment, the carbonate is about 25%.

In one example of preparing BZCYYb lithium-potassium carbonate is typically made first. Stoichiometrical amount of $Li_2CO_3$ and $K_2CO_3$ were mixed in the weight proportion of 45.8:52.5 and milled in a vibratory mill for 1 hour. The mixture was then heated to 600° C. for 2 hours. The heated mixture was then quenched in air to the room temperature and ground. The resulting lithium-potassium carbonate was used later in the preparation of composite electrolyte with BZCYYb.

In one embodiment the BZCYYb powder was prepared by solid-state reaction, but other methods could also be used. Stoichiometric amounts of high-purity barium carbonate, zirconium oxide, cerium oxide, ytterbium oxide and yttrium oxide powders (all from Sigma-Aldrich® Chemicals) were mixed by ball milling in ethanol (or other easily evaporated solvent) for 24 h, followed by drying at 80° C. for overnight and calcinations at 1100° C. in air for 10 h. The calcinated powder was ball milled again, followed by another calcination at 1100° C. in air for 10 h to produce single phase BZCYYb.

The resulted BZCYYb powder and the carbonate obtained above were mixed at weight ratio of 75:25 and thoroughly ground again for one hour. The mixture was then heated to 680° C. for 60 minutes until only the carbonate melted and wet the BZCYYb grain boundaries in the mixture. Next, it was quenched (i.e. fast cooling) in air to room temperature. The quenched mixture was ground again to get the composite electrolyte powder.

In another example an alternate way of preparing BZCYYb powder can be described. In this embodiment stoichiometric amounts of high-purity barium carbonate, zirconium oxide, cerium oxide, ytterbium oxide, and yttrium oxide powders (all from Sigma-Aldrich® Chemicals) were mixed by ball milling in ethanol for 48 h, followed by drying in an oven and calcination at 1100° C. in air for 10 h. The calcined powder was ball milled again, followed by another calcination at 1100° C. in air for 10 h.

The $CeO_2$ and $ZrO_2$ powders with different particle sizes were used to optimize the fabrication procedures. To prepare electrolyte samples for the conductivity measurement, we pressed the calcined powders isostatically into a disk at 274.6 MPa. The green disks had a diameter of 10 mm, with a typical thickness of 1 mm. The disks were then sintered at 1500° C. for 5 h in air (relative density >96%).

In some embodiments a Sc-doped BZCY powder can be prepared. In one example of this embodiment BZCY-Sc with a nominal composition of $BaCe_{0.7}Zr_{0.1}Y_{0.1}Sc_{0.1}O_{3-\delta}$ (BZCY-Sc) was synthesized by a conventional solid state reaction (SSR) method. Stoichiometric amount of high-purity barium carbonate, zirconium oxide, cerium oxide, yttrium oxide and scandium oxide powders ($BaCO_3$: ZrO2: $CeO_2$: $Y_2O_3$: $Sc_2O_3$=167.33: 12.32: 120.48: 22.58: 13.79, all from Sigma-Aldrich® Chemicals) were mixed by ball milling in ethanol for 24 hours, followed by drying at 80° C. for overnight and calcinations at 1100° C. in air for 10 hours. The calcined powder was ball milled again, followed by another calcination at 1100° C. in air for 10 hours to produce single phase BZCY-Sc.

In the present method, the calcining step is carried out at preferably higher than 1000° C. in air for 10 hours. However, the temperature and the length of calcination can vary, depending on different factors to be considered, such as the particle size chosen. The particle size of the zirconium oxide powder is preferably between 50 nm and 200 nm, and more preferably between 50 nm and 100 nm. The particle size of the cerium oxide powder is preferably between 1 µm and 20 µm, and more preferably between 5 and 10 µm.

As described above the current embodiments describe a SOFC wherein at least one electrode has been infiltrated with a promoter using gas phase infiltration. This infiltration can occur either before the formation of the fuel cell or after the formation of the fuel cell.

In another embodiment the electrolyte can be yttria stabilized zirconia, scandia stabilized zirconia, gadolinium doped ceria, samarium doped ceria, doped barium zirconate cerate, or combinations thereof.

Different types of gas phase infiltration can be utilized. In one embodiment the gas phase infiltration involves chemical vapor deposition (U.S. Pat. No. 5,261,963) or even physical vapor deposition. Examples of physical vapor deposition can include evaporative deposition or sputter deposition. The infiltration can either occur at the anode or the cathode.

In one embodiment the promoter is selected from the group consisting of a group 1, group 2, group 4, group 6 or lanthanide elements when infiltrating the anode electrode. More specifically, the infiltration can be with the group selected from Mo, Pr, Mg, Ca, Sr, Ba, K, Ce, La, Zr, Mn, Fe, Pd, Cu, Sn, Pt, Ag, Ru, Ir, Sm, Gd elements, or combinations thereof. In some embodiments the promoter can be an oxide or a hydroxide.

In another embodiment the promoter is selected from the group consisting of a group 2, group 8, group 9, group 10, group 15 or lanthanide elements when infiltrating the cathode electrode. More specifically, the infiltration can be with the group selected from Pr, Sr, Ce, Fe, Co, La, Sm, Ni, Gd, Ca, Ba, Bi, Ga, Mg, Pt, Ag, Ru elements, or combinations thereof. In some embodiments the promoter can be an oxide or a hydroxide.

In one embodiment during chemical vapor deposition the promoter would be volatile element or compounds such as Ba, Mo, TiCl, or metal-organic compounds.

During this gas phase infiltration the promoter layer added to either the anode or the cathode can vary in thickness from about 1 nm to 100 nm or even 1000 nm both on the surface and the interior of the electrode.

The temperature of the gas phase infiltration can occur at temperatures less than 1000° C., 500° C. or even 250° C.

In one embodiment the SOFC infiltrated is comprises a porous BZCYYb electrolyte or a Sc-doped BZCY.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A solid oxide fuel cell, comprising:
   an electrolyte;
   an anode; and
   a cathode,
   wherein at least one electrode has been modified with a promoter layer, using gas phase infiltration, having a thickness from 1 nm to 1000 nm, wherein the electrode is infiltrated with the promoter selected from the group consisting Pr, Ce, Sn, Sm, Gd or combinations thereof, and
   wherein the anode is pre-reduced at a temperature from 400° C. to 800° C. in a reducing atmosphere containing 1-100% hydrogen or other reducing gas atmospheres.

2. The solid oxide fuel cell of claim 1, wherein the gas phase infiltration technique involves chemical vapor deposition.

3. The solid oxide fuel cell of claim 1, wherein the gas phase infiltration technique involves physical vapor deposition.

4. The solid oxide fuel cell of claim 1, wherein the electrode infiltrated is the anode.

5. The solid oxide fuel cell of claim 1, wherein the electrode infiltrated is the cathode.

6. The solid oxide fuel cell of claim 1, where the promoter is an oxide or a hydroxide.

7. The solid oxide fuel cell of claim 1, where the promoter is an oxide or an hydroxide.

8. The solid oxide fuel cell of claim 1, wherein the gas phase infiltration occurs at temperatures equal to or less than the temperature used for electrolyte sintering.

9. The solid oxide fuel cell of claim 1, wherein the gas phase infiltration occurs at temperatures less than 1000° C.

10. The solid oxide fuel cell of claim 1, wherein the gas phase infiltration occurs at temperatures less than 500° C.

11. The solid oxide fuel cell of claim 1, wherein the infiltration occurs after the formation of the fuel cell.

12. The solid oxide fuel cell of claim 1, wherein the electrolyte is selected from the group comprising of yittria stabilized zirconia, scandia stabilized zirconia, gadolinium doped ceria, samarium doped ceria, doped barium zirconate cerate, or combinations thereof.

13. The solid oxide fuel cell of claim 1, wherein the cathode is selected from the group comprising of: lanthanum strontium iron cobalt oxide, doped ceria, strontium samarium cobalt oxide, lanthanum strontium iron oxide, lanthanum strontium cobalt oxide, barium strontium cobalt iron oxide, or combinations thereof.

14. The solid oxide fuel cell of claim 1, wherein the anode is selected from the group comprising of: nickel oxide, nickel, yittria stabilized zirconia, scandia stabilized zirconia, gadolinium doped ceria, samarium doped ceria, doped barium zirconate cerate, or combinations thereof.

15. The solid oxide fuel cell of claim 1, wherein the electrolyte comprises a Sc doped BZCY.

16. The solid oxide fuel cell of claim 1, wherein the electrolyte comprises a porous BZCYYb electrolyte.

* * * * *